US00RE42002E

(19) United States
(12) Reissued Patent
Riceman et al.

(10) Patent Number: US RE42,002 E
(45) Date of Reissued Patent: Dec. 14, 2010

(54) APPARATUS AND METHOD FOR HIGH SPEED DATA COMMUNICATION

(76) Inventors: William K. Riceman, 2817 Providence Church Rd., Anderson, SC (US) 29626; Robert G. Riceman, 2 Mitchell St., Apt 305, Oneonta, NY (US) 13820; Stephen A. Hollock, 135 Hickory Hill Rd., Otego, NY (US) 13825-2197

(21) Appl. No.: 11/482,204

(22) Filed: Jul. 6, 2006

Related U.S. Patent Documents

Reissue of:
(64) Patent No.: 6,760,779
Issued: Jul. 6, 2004
Appl. No.: 09/239,944
Filed: Jan. 29, 1999

U.S. Applications:
(63) Continuation-in-part of application No. 08/889,776, filed on Jul. 8, 1997, now Pat. No. 5,960,067.
(60) Provisional application No. 60/021,345, filed on Jul. 8, 1996.

(51) Int. Cl.
*H04K 1/10* (2006.01)
*G06F 11/30* (2006.01)
*G06F 15/16* (2006.01)

(52) U.S. Cl. ..... 713/189; 380/31; 380/34; 380/38; 709/246; 709/247; 709/250

(58) Field of Classification Search ..... 380/31, 380/34, 38; 713/189
See application file for complete search history.

(56) References Cited

U.S. PATENT DOCUMENTS

| | | | | |
|---|---|---|---|---|
| 4,635,278 | A | 1/1987 | Maloon et al. | |
| 4,641,318 | A | 2/1987 | Addeo | |
| 4,734,920 | A | 3/1988 | Betts | |
| 4,775,987 | A | 10/1988 | Miller | |
| 4,821,289 | A | 4/1989 | Peile | |
| 5,016,275 | A | 5/1991 | Smith | |
| 5,052,040 | A | 9/1991 | Preston et al. | |
| 5,058,164 | A | 10/1991 | Elmer et al. | |
| 5,467,367 | A | 11/1995 | Izumi et al. | |
| 5,479,447 | A | 12/1995 | Chow et al. | |
| 5,497,397 | A | 3/1996 | Hershey et al. | |
| 5,517,433 | A | 5/1996 | Morrison | |
| 5,519,731 | A | 5/1996 | Cioffi | |
| 5,625,651 | A | 4/1997 | Cioffi | |
| 5,809,070 | A | 9/1998 | Krishnan et al. | |
| 5,956,332 | A | 9/1999 | Rasanen et al. | |
| 6,252,910 | B1 | 6/2001 | West et al. | |
| 6,275,990 | B1 * | 8/2001 | Dapper et al. | 725/106 |
| 6,856,652 | B2 | 2/2005 | West et al. | |

OTHER PUBLICATIONS

Chan, Maurice C–C. and Justin C–I Chuang, "Multicode High–Speed Transmission with Interference Cancellation for Wireless Communications," Department of Electrical and Electronic Engineering, The Hong Kong University of Science and Technology, Clear Water Bay, Kowloon, Hong Kong, May 1996, pp. 661–665.

Santella, Giovanni and Franco Mazzenga, "A Model For Performance Evaluation In M–QAM–OFDM Schemes In Presence Of NonLinear Distortions," Fondazione Ugo Bordoni (Viale Europa 190.00144, Rome), Copyright 1995, pp. 830–834.

Lei, Wei, "Synchronization Requirements for Multi–User OFDM on Satellite Mobile and Two–path Rayleigh Fading Channels," IEEE Transactions on Communications, vol. 45, No. 2/3/4, Feb./Mar./Apr. 1995, pp. 887–895.

(Continued)

*Primary Examiner*—Benjamin E Lanier

(57) ABSTRACT

An apparatus and method for high speed transmission of data over a transmission line/medium/network telephone, wherein this high speed is achieved by simultaneously, or in a timed and marked relationship, transmitting multiple bits of data over parallel frequencies rather than serially transmitting one bit of data at a time over one frequency.

72 Claims, 5 Drawing Sheets

OTHER PUBLICATIONS

Wu, Yiyan and William Y. Zou, "Orthogonal Frequency Division Multiplexing: A Multi–carrier Modulation Scheme," IEEE Transactions on Consumer Electronics, vol. 41, No. 3, Aug. 1995, pp. 392–399.

Schnell, Michael, "Interference Calculations fo MC–SSMA Systems in Mobile Communications," Institute for Communications Technology, Jan. 1995, pp. 158–163.

Rohling, H. and Grunheid, R., "Performance of an OFDM–TDMA Mobile Communication System," Institute of Telecommunications, Technical University Braunschweig, May 1996, pp. 1589–1593.

Sandberg, Stuart D. and Michael A. Tzannes, "Overlapped Discrete Multitone Modulation for High Speed Copper Wire Communications," IEEE Journal on Selected Areas in Communications, vol. 13, No. 9, Dec. 1996.

Chow, Jacky S., Jerry C. Tu and John M. Cioffi, "A Discrete Multitone Transceiver System HDSL Applications," IEEE Journal on Selected Areas in Communications, vol. 9, No. 6, Aug. 1991, pp. 895–908.

Ghareeb, Ibraheim, "Bit Error Rate Performance and Power Spectral Density of a Noncoherent Hybrid Frequency–Phase Modulation System," IEEE Journal on Selected Areas in Communications, vol. 13, No. 2, Feb. 1995, pp. 276–284.

Nikookar, Homayoun and Ramjee Prasad, "OFDM Performance Evaluation Over Measured Indoor Radio Propagation Channels," International Research Center for Telecommunications–Transmission and Radar(IRCTR) & Telecommunications and Traffic Control Systems Group, Department of Electrical Engineering, Apr. 1995, pp. 968–972.

Van Kerckhove, Jean–Francois and Paul Spruyt, "Adapted Optimization Criterion for FDM–based DMT–ADSL Equalization," copyright 1996, pp. 1328–1334.

Ayanoglu, Ender, "Adaptive ARQ/Fec for Multitone Transmission in Wireless Networks," copyright 1995, pp. 2278–2283.

Fazel, Khaled and Michael J. Ruf, "A Hierarchical Digital HDTV Transmission Scheme For Terrestrial Broadcasting," copyright 1993, pp. 12–17.

Saito, Masafumi, Shigeki Moriyama, and Osamu Yamada, "A Digital Modulation Method For Terrestrial Digital TV Broadcasting Using Trellis Coded OFDM and its Performance," copyright 1992, pp. 1694–1698.

Bingham, John A.C., "Multicarrier Modulation For Data Transmission: An Idea Whose Time Has Come," copyright 1990, pp. 5–14.

Zhao, Yuping and Sven–Gustav Haggman, "Sensitivity to Doppler Shift and Carrier Frequency Errors in OFDM Systems—The Consequences and Solutions," copyright 1996, pp. 1564–1568.

Cioffi, John, "Bell Labs Managers Laughed at the Idea of Broadband Over Phone Lines," EE Times, http://www.eetimes.com/disruption/essays/cioffi.jhtml as of Apr. 4, 2007, 4 pages.

Veeneman, Dale and Robert Olshansky, "ADSL for Video and Data Services," copyright 1995, pp. 837–841.

Chow, Peter S. Jerry C. Tu, and John M. Cioffi, "Performance Evaluation of a Multichannel Transceiver System for ADSL and VHDSL Services," IEEE Journal on Selected Areas in Communications, vol. 9, No. 6, Aug. 1991, pp. 909–919.

Kamran Sistanizadeh, Peter S. Chow, and John M. Cioffi, "Multi–Tone Transmission for Asymmetric Digital Subscriber Lines (ADSL)", Communications, 1993. ICC 93. Geneva. Technical Program, Conference Record, IEEE International Conference, vol. 2, May 23–26, 1993, pp. 756–760.

Peter S. Chow and John M. Cioffi, "A Multi–Drop In–House ADSL Distribution Network", Comunications, 1994. ICC '94, SUPERCOMM/ICC '94, Conference Record, 'Serving Humanity Through Communications.' IEEE International Conference, vol. 1, May 1–5, 1994, pp. 456–460.

Peter S. Chow, John M. Cioffi, and John A.C. Bingham, "DMT–Based ADSL: Concept, Architecture, and Performance", High speed Access Technology and Services, Including Video–on–Demand (Digest No. 1994/192), IEE Colloquium, Oct. 19, 1994, pp. 1–6.

T.N. Zogakis, J.T. Aslanis Jr. and J.M. Cioffi, "Analysis of Concatenated Coding Scheme for a Discrete Multitone Modulation System", Proceedings of IEEE Military Communications Conference (MILCOM '94), vol. 2, Oct. 1994, pp. 433–437.

Richard Karpinski, "Adsl: Alive and (seemingly) well", Telephony, Mar. 14, 1994, vol. 226–11 pp. 26–27.

Richard Karpinski, "ADSL picks up new speeds, options", Telephony, Sep. 13, 1993, vol. 225–11, pp. 12–14.

* cited by examiner

Amended

Amended

FIG. 4

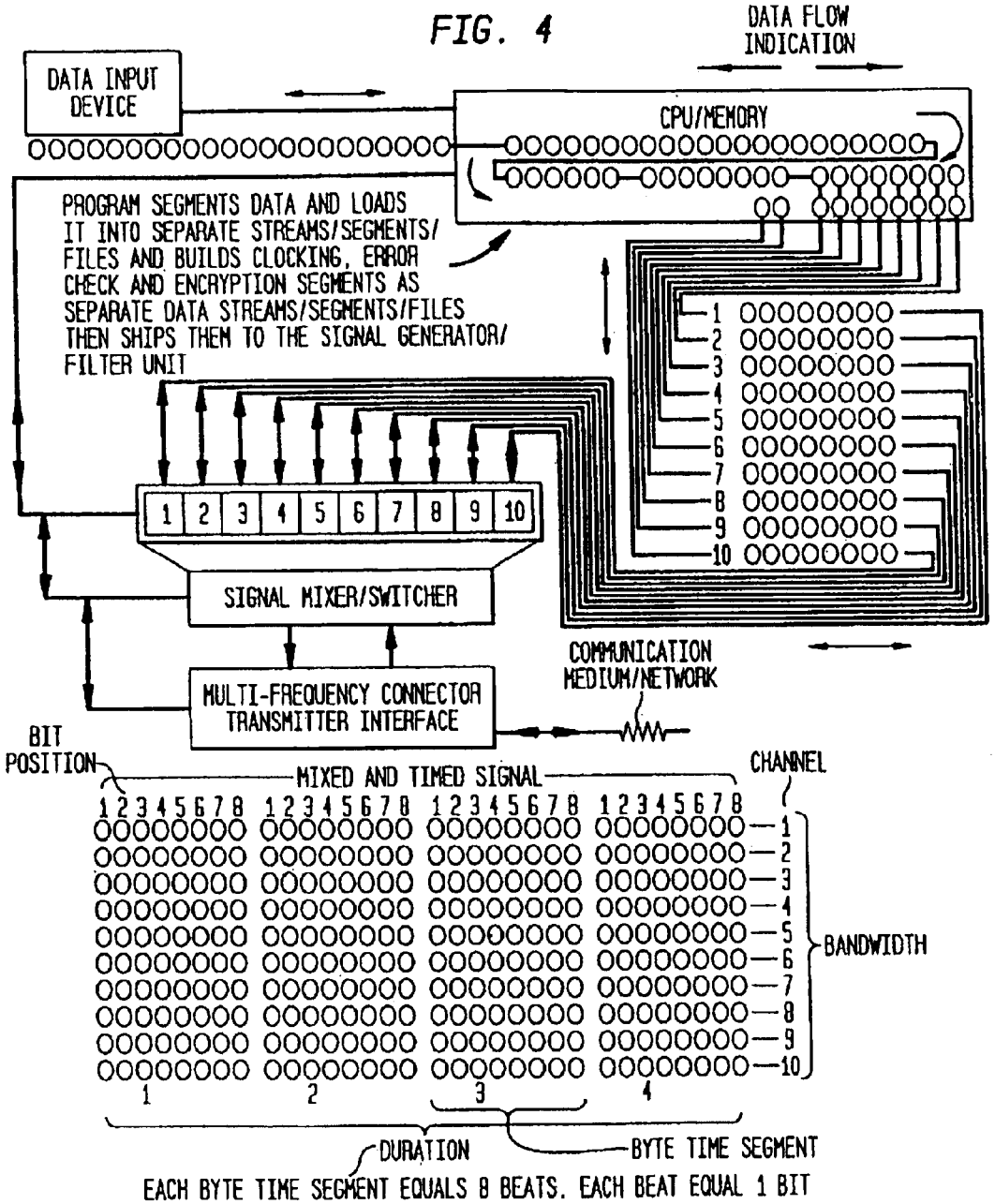

THE MIXER/SWITCHER OVERLAYS AND COMBINES THE MULTIPLE DATA STREAMS/SEGMENTS SO THAT THE DATA SIGNAL SEQUENCE REMAINS INTACT IN TIME I.E. BIT 1 IN POSITION 1 IN BYTE TIME SEGMENT 1 IS TRANSMITTED ON CHANNEL 1 ALL OTHER BITS IN THE NUMBER 1 POSITION WITHIN BYTE TIME SEGMENT 1 ARE SIMULTANEOUSLY TRANSMITTED ON THEIR RESPECTIVE CHANNELS. THE SAME WITH 2,3,4,5,6, AND 7 ETC. THE ERROR CHECK/CLOCKING/ENCRYPTION SIGNALS ON CHANNELS/ FREQUENCIES 9 AND 10 WOULD BE USED TO INSURE THE DATA ALIGNMENT AND INTEGRITY AS WELL AS TO DECODE DATA UPON RECEPTION.

FIG. 5

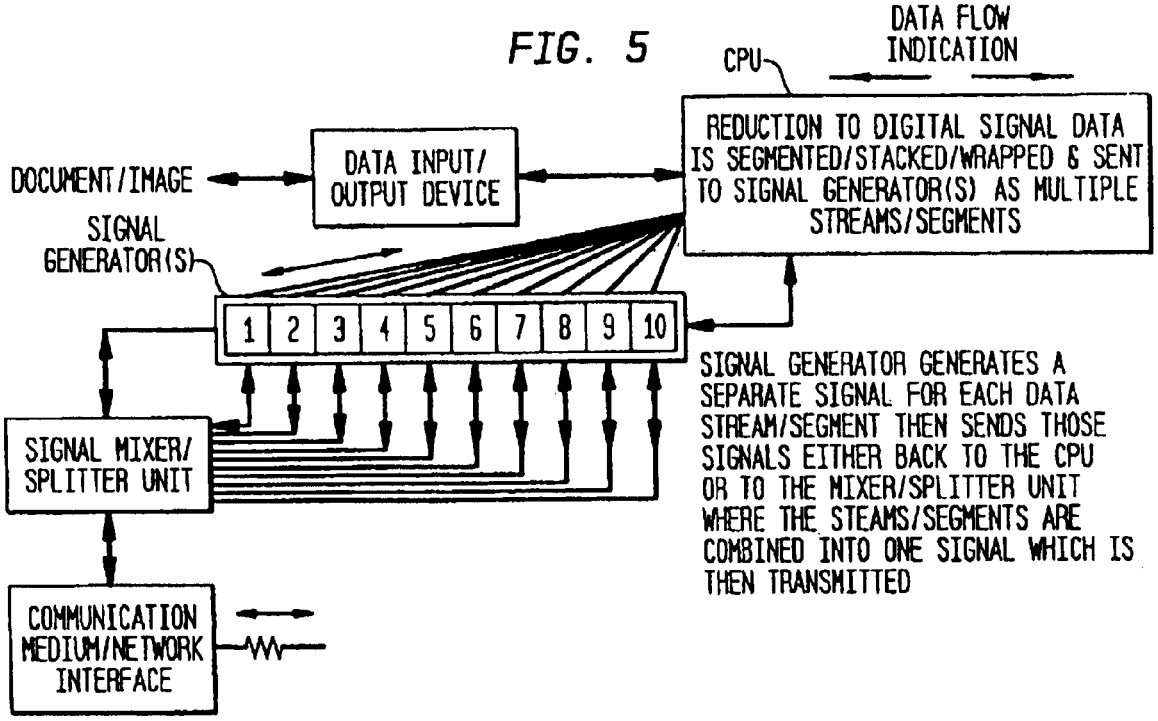

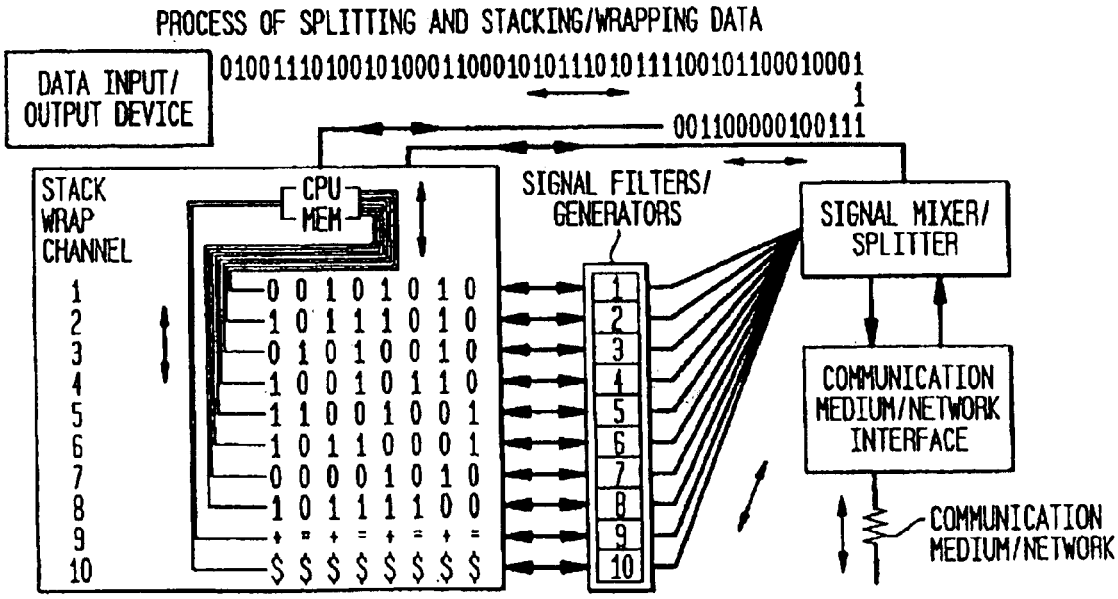

PROGRAM PROCESSING STEPS:

1. INCOMING DIGITAL DATA IS SEGMENTED/SPLIT INTO MULTIPLE DATA STREAMS/SEGMENTS WHERE EACH BIT OF DATA IS ASSIGNED TO AND PROCESSED INTO A KNOWN POSITION WITHIN A PRE-DETERMINED STACKED/WRAPPED CONFIGURATION CONSISTING OF MULTIPLE DATA STREAMS/SEGMENTS. 2. CLOCKING, ERROR CHECK AND ENCRYPTION SIGNALS ARE CREATED AS ADDITIONAL STREAMS/SEGMENTS. 3. EACH DATA STREAM/SEGMENT IS SENT TO A SIGNAL GENERATOR WHERE IT IS ASSIGNED A SEPARATE SIGNAL FREQUENCY AND PROCESSED AS SINGLE FREQUENCY SIGNAL. 4. AFTER SIGNAL PROCESSING IS COMPLETED ALL OF THE SEPARATE DATA STREAMS/SEGMENTS ARE MIXED TOGETHER INTO A SINGLE MULTI-FREQUENCY SIGNAL. 5. THE COMBINED SIGNAL IS TRANSMITTED.

APPARATUS AND METHOD FOR HIGH SPEED DATA COMMUNICATION

Matter enclosed in heavy brackets [ ] appears in the original patent but forms no part of this reissue specification; matter printed in italics indicates the additions made by reissue.

This application is a continuation-in-part of U.S. patent application Ser. No. 08/889,776, entitled Apparatus and Method For High Speed Data Communication, filed on Jul. 8, 1997 by Riceman, which claims the benifit of the filling date of Provisional Patent Application Serial No. 60/021,345 filed on Jul. 8, 1996.

FIELD OF THE INVENTION

This invention relates to devices for transmitting data over a communication line/medium/network, and more particularly to an apparatus and a process for transmitting data in parallel over a communication line/medium/network.

BACKGROUND OF THE INVENTION

Devices for transmitting data over communications lines such as modems are well known in the prior art. These devices are commonly used throughout the world to enable businesses, governments and educational institutions to conduct their affairs. They are also being used more commonly in homes throughout the world for personal computing and communication. The use of these devices continues to increase as ever larger numbers of people are communicating on the information super highway.

Although improvements in modem technology enable the speed at which these devices operate to be periodically increased, the process they employ to transmit data serves as an inherent limitation on the top speed they will ever be able to attain. This is because conventional modems transmit data in serial, i.e. one bit of data at a time, over one frequency. It is, therefore, an object of this invention to provide an apparatus and a process which overcomes this limitation by simultaneously transmitting multiple bits of data over parallel frequencies within the narrowest possible bandwidth while providing a higher level of security.

SUMMARY OF INVENTION

An apparatus and method for high speed transmission of data over a communication line/medium/network, wherein this high speed is achieved by generating multiple signals which are alternately combinable and [seperable] *separable* to enable multiple bits of data to be transmitted simultaneously and or in a timed relationship over parallel frequencies rather than being transmitted one bit at a time over one frequency.

BRIEF DESCRIPTION OF THE DRAWINGS

Referring to FIGS. 4 and 5 there are shown two drawings depicting two additional examples of how the invention which is the subject of this application operates on bits of data in the handling of yet another form of data configuration, such as but not limited to, the real time processing, transmission and reception of voice and/or video files.

DETAILED DESCRIPTION OF THE INVENTION

Figure 1:
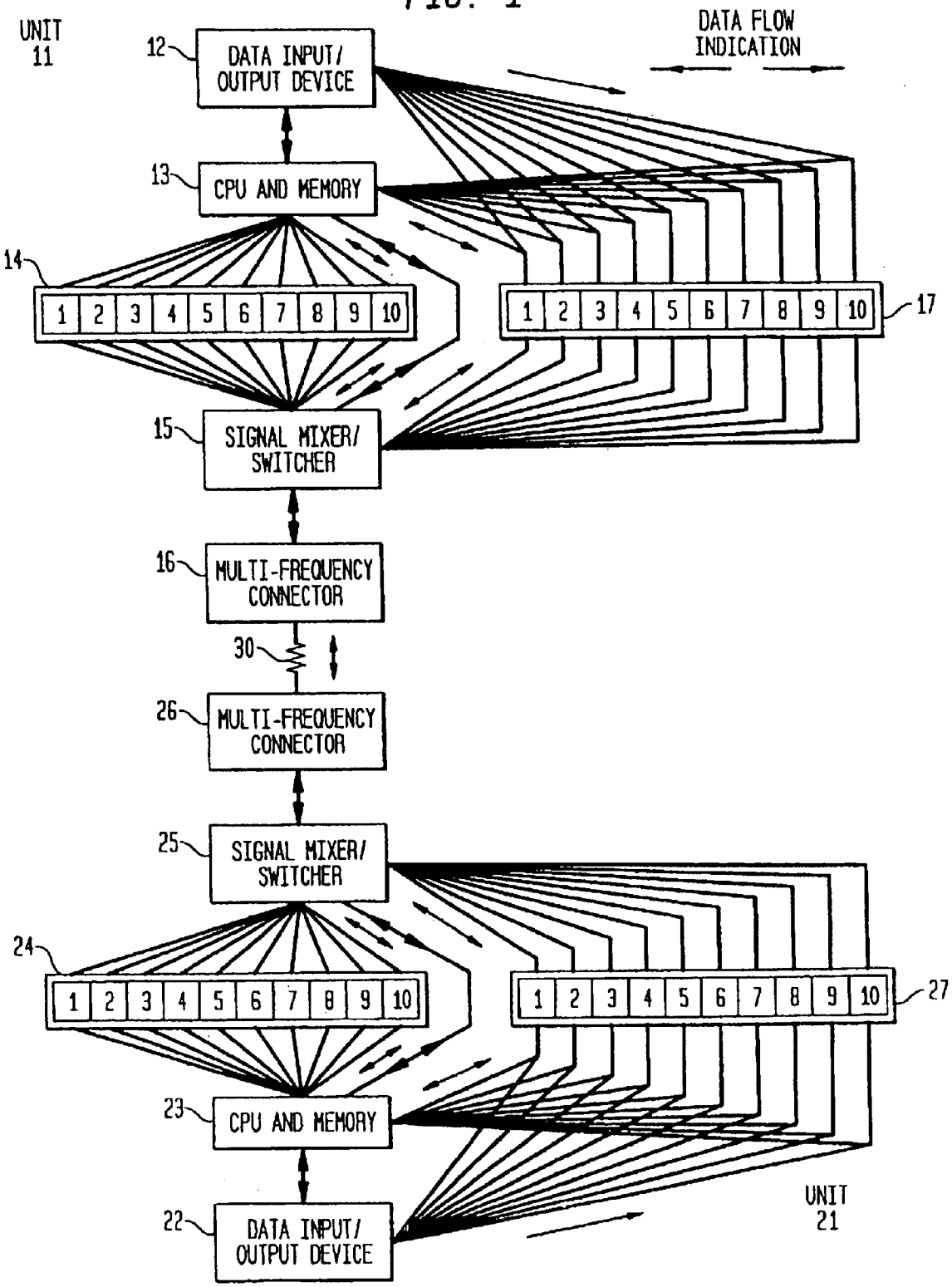
Referring to FIGS. 1 and 2 there are shown two exemplary embodiments of the apparatus which is the object of this invention.

Referring to FIG. 1, there is shown a system for high speed parallel transmission of data over a communication line/medium/network according to the present invention [10]. This system is comprised of two basically identical transmitter/receivers 11 and 21. Transmitter-receiver 11 is comprised of one or more data input/output device(s) 12, CPU and/or memory 13, outgoing signal generator(s) 14, mixer/switcher 15 multi-frequency connector 16 and incoming signal discriminators/filters 17. Transmitter-receiver 21 is comprised of one or more data input/output device(s) 22, CPU and/or memory 23, outgoing signal generator(s) 24, mixer/switcher 25, multi-frequency connector 26, incoming signal discriminator/filters 27. Device 11 is coupled to device 21 over a communication line/medium/network, such as but not limited to, a standard copper telephone line 30. The system disclosed herein can be used to transmit data via computer, facsimile machine, video telephones or any similar device.

There is a limit to the amount of data which can be transmitted over conventional communications systems using existing technology. The fastest conventional modems are only able to transmit 56.6 thousand bits of data per second and this only if the communication line is a short wire, digital, cable or fiber optic cable or is a radio wave broadcast and then only if the access provider can support such a signal. In addition, throughout most of the world, only 28.8 or even 14.4 thousand bits of data, and in some cases even less, can be transmitted per second over the existing copper telephone lines which are all that is typically available.

Even the newest asymmetric systems require the installation of a network card within both the sending and receiving units, a special modem and the payment of a monthly access fee to one or more special communication line provider.

The present invention allows much greater amounts of data to be transmitted by splitting the signal to be transmitted over an existing telephone line or other communication medium/network into multiple signals which, when combined, form a multi-layered t[ ]one/signal which can later be filtered/separated and processed, thereby allowing multiple bits of data to be transmitted either simultaneously, or in a timed relationship, over parallel frequencies within, wherever advantageous, the narrowest possible bandwidth configuration.

Further, the present invention performs this function without all of the aforementioned expensive state of the art hardware and needless expense of a monthly special access fees.

By eliminating the aforementioned special communication access gate, and thus the gate keepers monthly fee and equip[t]ment cost, the present invention will greatly enhance the accessibility of information in even the remotest areas of the poorest countries of the world.

One of the primary objectives of the present invention is to effectively address the desperate need for providing, to the largest number of people worldwide, rapid, inexpensive and dependable interactive access to existing and future information resources.

One of the primary reasons that the aforementioned remote and/or primitively equipped areas of the third world are presently developmentally hindered and/or politically volatile is due directly to their lack of rapid and adequate information access. The present invention is specifically designed to remedy this and other local and world wide information access problems.

One of the ways the present invention addresses the aforementioned problems is by the flexibility of its design and implementation methodology.

The present invention may be produced as a simple after market (plug and play) device which can be easily connect[ ]ed to and used with existing hardware such as, but not limited to, computers, televisions and fax machines. Alternatively, the present invention may be incorporated into these and other like devices during the manufacturing process.

Further, the present invention will provide for the aforementioned world wide enhanced and affordable rapid access to information now, when it is most needed. There will no longer be the necessity of waiting for the painfully slow and [expansive] *expensive* installation of more modern communication lines and hardware such a fiber optic, cable or satellite networks.

The present system is designed to transmit data which can be generated or saved in a one or two bit/[bite] *byte* format or any derivative or multiple thereof. Transmission of the thus formatted data is based on whether a bit signal is present or absent, i.e., is defined/marked/modulated or in some way signified as either on or off.

Detection on the receiving end is based on either the presence or absence of said bit signal demarcated by said defined/marked/modulated specific tone/frequency, while all other tones/frequencies are filtered out and/or ignored or otherwise identified and disregarded. Once the thus received data is converted back into its original bit code format, the data may be viewed, shipped, further processed, printed, otherwise used or saved for later use.

Figure 2:
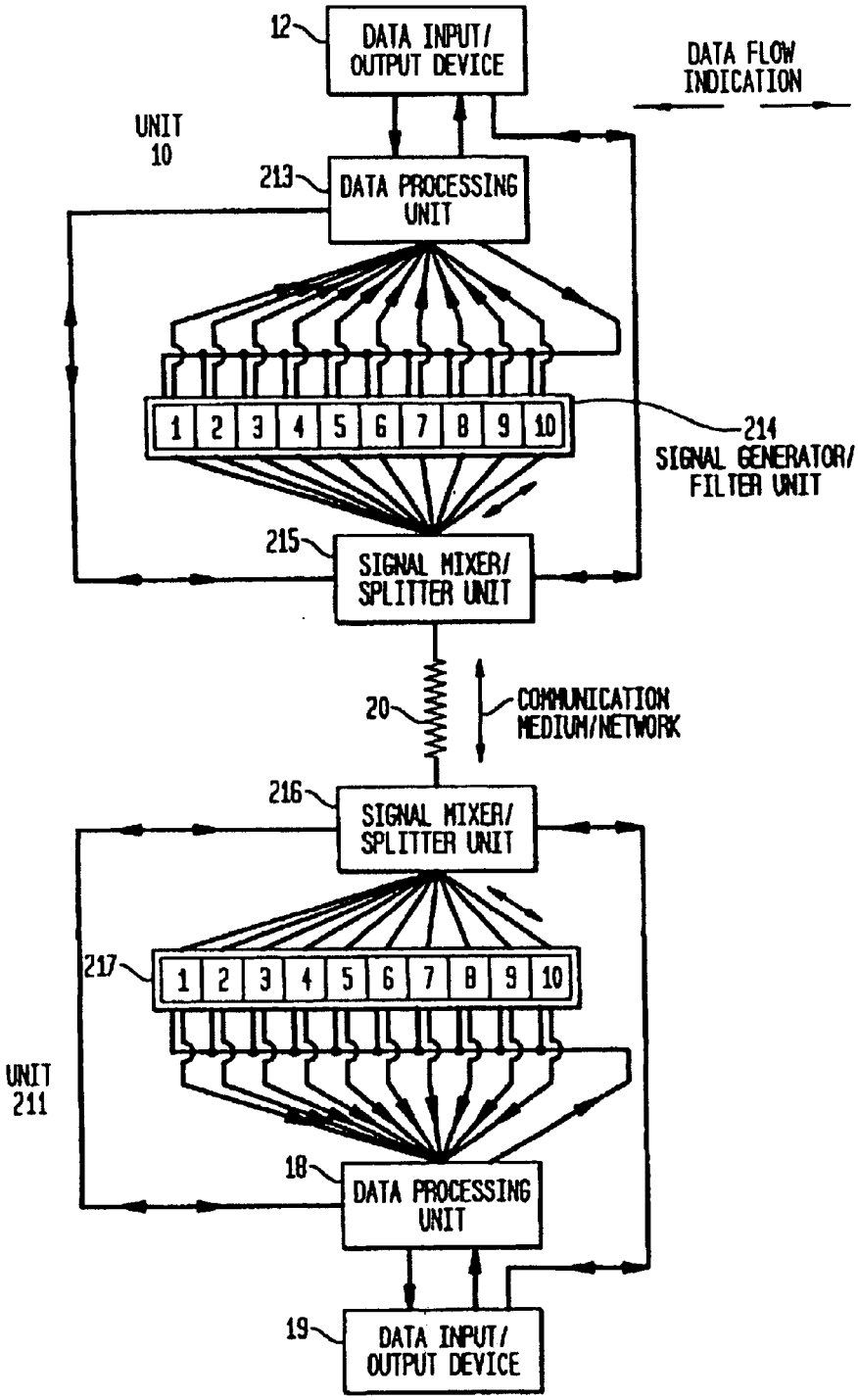

Referring to FIG. 2, there is shown one of the many possible configurations example of a system for high speed parallel transmission of data over a communication line/medium/network according to the present invention. This system is comprised of two basically identical transmitter/receiver units 10 and *2*11. Unit 10 is comprised of one or more data input-output device(s) 12, one or more data processing unit *2*13(s), signal generator(s)/filter(s) unit(s) *2*14 and signal mixer/splitter unit *2*15(s). Unit *2*11 is comprised of one or more data input-output device(s) 19, data processing unit 18, signal generator(s)/filter(s) unit *2*17 and signal mixer/splitter unit *2*16. Unit 10 is connected to unit *2*11 via a communication line/medium/network such as, but not limited to, a standard copper telephone line 20. The system herein can be used to transmit and/or receive data via a computer, television, telecommunications network, digital network, facsimile machine, video telephone or other similar device, system or networks either by utilization of direct (hard wired) and/or broadcast (wireless) systems.

Figure 3:
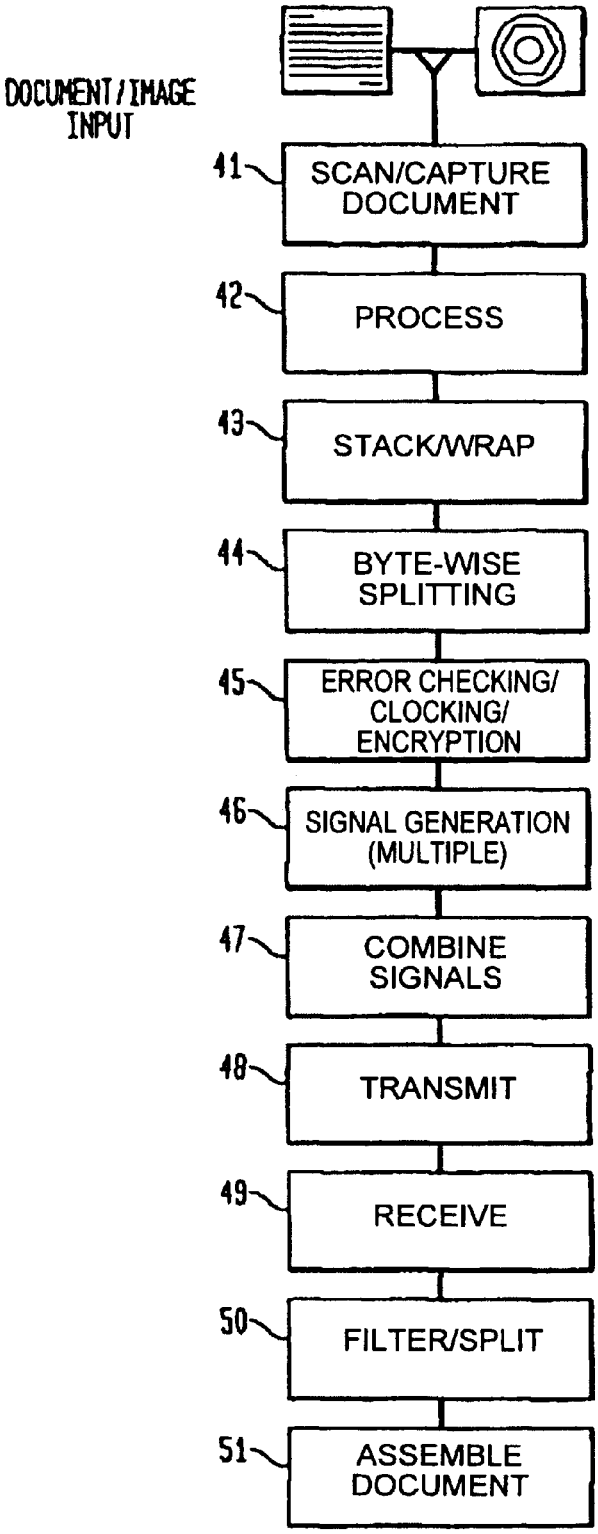
Referring to FIG. 3 there is shown a flow chart illustrating one example of the process which is the object of this invention as it relates to large files such as, but not limited to, stacks of document pages and/or picture files only.

Referring to FIG. 3, there is shown a flowchart detailing one process by which data may be transmitted according to the present invention as it relates to large files such as, but not limited to, multi-page document and/or image files. To transmit a document/image/data file [40], using this invention, the document/image/data file is first scanned/captured at 41 or created in a computer or other device and processed as a binary/digital signal in the CPU at 42. This data may or may not be compressed before, during or after being stacked/wrapped at step 43.

At step 44 this stacked/wrapped signal is then processed so that: the first eight bits processed are designated as a first data stream/segment, File 1; the next eight bits processed are designated as a second data stream/segment, File 2; and so on. Alternatively, the data can be processed so that: the first bit of the first byte is placed in a first data stream/segment, File 1; and the second bit of the first byte is placed in a second data stream/segment, File 2; and so on. At step 44 the stacked/wrapped signal is split into eight or more data stream(s)/segments containing an equal, or [ue-equal] *un-equal* but unknown, number of bits. Error check and/or clocking/encryption may then be created and added as additional data stream(s)/segment(s) and/or be appended to one or more of said eight or more data streams/segments. Any or all data streams/segments may then be further processed, stored or transmitted.

At step 42, 43, 44 and/or 45 each signal may have added to it a timed start/stop and/or sequence/encryption command to instruct the receiving processor how to read and reassemble the data. Alternatively, the timed start/stop and/or sequence/encryption command may be added to less than all of the data streams/segments. One example of the operation of steps 43, 44 and 45 on a single byte of data is shown in FIG. [3] *4*.

At step 46 the ten different data streams/segments are ideally sent to separate signal generators, which generators create multiple binary/digital signals separated from one another by a set frequency bandwidth. For, one non-limiting example, these multiple signals over which the data in question are to be transmitted could, using tones as an example only, begin at 500 Hertz, with each successive frequency being separated by 750 Hertz. This designation of frequencies can be implemented using existing telephone wiring and hardware and will allow for a minimum of 250 Hertz safe zone of separation with generated beat frequencies. Alternatively, the generated frequencies can be separated from one another by varying, predetermined frequency bandwidths. Moreover, instead of being sent to one signal generator capable of generating multiple signals of varying frequency for each data streams/segments. Alternatively, the aforesaid data streams/segments could be processed separately or sequentially by one or more multi-frequency signal generator(s). Although this sequential processing would be somewhat slower than multi-unit processing, due to the speed of modern processors, it would still allow a much higher transmission speed than can be attained by conventional modems.

At step 47 the signals from the one or more multiple frequency signal generators are combined by the signal mixer/switcher into one multi-frequency combined/layered signal which is in a timed and marked sequence. The mixer overlays/combines the multiple signal so that the individual signal sequence remain relatively intact in time, i.e. bits 1 through 10 are transmitted and received at the same relative time, i.e. they are transmitted in relative alignment and are received in that same relative alignment. Any synchronizational anomalies which may be introduced during processing, transmission or reception would be corrected at the receiving unit by referring to and making use of the aforementioned stop/start and/or timed sequence/encryption commands. Specifically, when the first bit of data stream/segment, file 1, is transmitted the first bit of data in each of streams/segments, file 2 through 10, are also simultaneously transmitted and/or are so marked as to be [re-alienable] *re-alignable* by the receiving unit if transmitted other than simultaneously. Each data bit position of the 10 or more signals equals one beat in time or time beat as duration relates to signal transmission.

At step 48 the multi-layered/multi-frequency mixed signal is transmitted over a communication line/medium/network. At step 49 the signal is received. At step 50 the signal is filtered/split and then sent to the CPU. At step 51 the signal is reassembled. From there the signal can either be viewed, used or stored in memory, sent to a printer or other output device or processing device for further processing. It is understood that any or all of the aforementioned sequencing, filtering/splitting, marking, re-assembly and processing steps may be performed within one or more processing devices located within or in proximity to the sending and/or receiving units and that such a configuration is included within the scope of and therefore covered by the present invention.

Using the aforementioned tonal frequency designations as an example, the following frequencies could be used to transmit data according to the present invention: 500, 1250, 2000, 2700, 3500, 4250, 5000, 6750, 6500 and 7250 Hertz. Beat frequencies (subtractive) generated would be at 750, 1500, 2250, 3000, 3750, 4500, 5250, 6000 and 6750 Hertz. Beat frequencies (additive) generated would be at 1750, 2500, 3250, 4000, 4750, 5500, 6250 and 7000 Hertz. In the foregoing embodiment, additional harmonics would not be closer than 250 Hertz to any main data transmission frequency.

In addition, all frequencies/signals generated above 7500 Hertz would be filtered out or ignored as they would not be used. The foregoing frequencies are representative only and are in no way meant as a limitation.

It is, of course, understood that as filtering and processing technology improves, the separation needed between usable bandwidths which can be filtered or kept clearly separated will narrow so that less bandwidth distance between usable frequencies is required, thereby providing more frequencies on which to transmit data.

It is further understood that the foregoing example is not intended as a limitation but is for example only and that other electromagnetic and optical frequency designations and configurations may be used and would also fall within the scope of the present invention.

Further, by using selected data encoding/encryption commands I.E. data reconfiguration codes or keys, which would be resident within only the sending and receiving units, or sent along or separate from said data transmission, the present invention can be used to encrypt and decrypt the data being transmitted. One way in which this may be accomplished would be by setting the signal to a bit numbering scheme which is set or configured differently for each data stream/segment and/or transmission sequence being transmitted, even to the point of employing a floating encryption based upon a pre-determined algorithm.

The foregoing would permit data to be securely transmitted without fear that the person receiving the transmission is not the intended recipient as may happen when a wrong telephone number is dialed. Only the intended recipient would have the timed encryption key required to reassemble and make use of the data received. Without the key the received data would be a meaningless jumble of random data bits with no discernible pattern.

An illustrative example of how data could be transmitted employing one of the configurations of the present invention, in its tonal embodiment, over the aforementioned frequency designations is provided below. Transmission of the word "TEST" using straight corresponding bit-dash tone/frequency code would occur as follows:

Beginning Code (Handshake) Sent Prior to Actual Document

T=84=01010100=6500+5000+3500+a parity type check tone+timing.

E=69=01000101=6500+5750+7250+a parity type check tone+timing.

S=83=01010011=6500+5000+6500+a parity type check tone+timing.

T=84=01010100=6500+5000+3500+a parity type check tone+timing.

End of Transmission Sequence

In the foregoing example, all four letters would be sent at the same time on four parallel frequencies and would be reassembled after reception based on the parity check and timing key sent along with the data.

FIGS. 3 and 4 show two drawings depicting two further examples of how the invention which is the subject of this application operates on bits of data.

It will be understood that the embodiments described herein are merely exemplary and that a person skilled in the art may make many variations and modifications to the described embodiments utilizing functionally equivalent elements and/or procedures to those described. Any variations or modifications to the invention just described are intended to be included within the scope of this invention as defined by the appended claims.

I claim:

[1. A method for simultaneously transmitting multiple data files/streams/segments at multiple frequencies over a communication line/medium/network at high speed, comprising the steps of:

splitting said data into multiple data files/streams/segments;

generating and adding an error check and/or clocking/encryption signal to said multiple data files/streams/segments as a first and/or first and additional file(s)/stream(s)/segment(s);

sending each one of said multiple data files/streams/segments, said first and/or first and additional data files/streams/segments to one or more separate signal generator(s);

generating a different signal for each one of said multiple data files/streams/segments, said first and/or first and additional file(s)/stream(s)/segment(s), wherein the frequency of each one of said signals are separated from one another by a specified frequency bandwidth;

combining said multiple signals into one multi-frequency signal; and transmitting sa id multi-frequency signal over a communication line/medium/network.]

[2. A method for transmitting multiple digital data files/streams/segments in a timed relationship to one another utilizing multiple frequencies over a communications line/medium/network at high speed, comprising the steps of:

splitting said digital data into multiple digital data files/streams/segments;

generating at least one error check and/or clocking/encryption signal as a first and/or first and additional data file(s)/stream(s)/segment(s) to be transmitted simultaneously with or separately from said multiple digital data filed/streams/segments;

sending each one of said multiple digital data files/streams/segments, said first or said first and additional data file(s)/stream(s)/segment(s) to one or more separate signal generator(s);

generating a different frequency signal for each one of said multiple data files/streams/segments, said first and/or first and additional file(s)/stream(s)/segment(s), wherein said multiple digital data files/streams/segments, said first and/or said first and additional, digital data file(s)/stream(s)/segment(s) are separated from one another by a specified frequency bandwidth; combining said multiple digital data files/streams/segments, said first and/or said first and additional digital file(s)/stream(s)/segment(s) into one or more multi-frequency signals(s); and transmitting said one or more multi-frequency signals(s) over one or more communication line(s)/medium(s)/network(s) in a timed and marked relationship to one another.]

[3. A method according to claim 1 or 2, wherein said first and/or said first and additional digital data file(s)/stream(s)/segment(s) is transmitted separately from but in a timed and marked relationship to said multi-frequency signal(s) containing said multiple digital data files/streams/segments.]

[4. The method according to claim 1, 2 or 3, wherein said multi-frequency signal(s) is/are segmented, said multi-frequency signal(s) segments being transmitted separately but in a timed and marked/encrypted relationship to one another over at least one communication line/medium/network.]

[5. The method according to claim 1, wherein said multiple data files/streams/segments are created from bytes of data to be transmitted, each of said bytes of data to be transmitted being comprised of bits of data, each of said bits corresponding to a particular position within said bytes of data to be transmitted, and each one of said data files/streams/segments being comprised of bits from said bytes corresponding to a particular positional alignment relative to one another which alignment is predetermined.]

[6. The method according to claim 1, 2, 3, 4 or 5, wherein said positional alignment of said bits of data from said bytes of data to be transmitted is marked by means of a separate clocking/encryption signal which may be added to and sent along with or separately from said combined multi-frequency signal containing said multiple digital data files/streams/segments.]

[7. The method according to claim 1, 2, 3, 4, 5 or 6, wherein said multiple data files/streams/segments are created from bytes of data to be transmitted, wherein each one of said multiple data files/streams/segments is comprised of, a separate, at least one of said bytes of data to be transmitted.]

[8. The method according to claim 1, 2, 3, 4, 5, 6, or 7, wherein a timed start/stop and/or sequence/encryption command is added to at least one of said multiple digital data files/streams/segments.]

[9. The method according to claim 1, 2, 3, 4, 5, 6 or 7, wherein said timed start/stop and/or sequence/encryption command is/are created as one or more separate data file(s)/stream(s)/segment(s) which may be transmitted along with or separately from, but in a timed and marked relationship to, said one or more multi-frequency signal(s) containing said multiple digital data files/streams/segments.]

[10. The method according to claim 1 or 2, wherein each one of said data files/streams/segments comprising said multi-frequency signal to be transmitted simultaneously or in a timed relationship, is comprised of a plurality of bits of data, each one of said bits corresponding to a particular sequential patterned and/or marked and/or encrypted positional relationship within said data files/streams/segments, and each bit of data within said data files/streams/segments corresponding to and being positionally located within said data files/streams/segments in a like sequential patterned and marked and/or encrypted positional relationship.]

[11. The method according to claim 10, wherein said sequential patterned and/or marked and/or encrypted positional relationship is designated by a separate, at least one, clocking/encryption signal which may be transmitted along with, or separately from, said one or more multi-frequency signal(s) containing said data files/streams/segments to be transmitted.]

[12. The method according to claim 1 or 2, wherein said multiple data files/streams/segments are transmitted in a timed and marked positional relationship to one another over one or more separate or multi-frequency transmission signal(s) but not simultaneously.]

[13. The method according to claim 1 or 2, wherein said multiple bits of data within said multiple data files/streams/segments corresponding to a first position in each one of said files/streams/segments are transmitted first, and the bits of data corresponding to a last position in each one of said data files/streams/segments are transmitted last.]

[14. The method according to claim 1 or 2, wherein the relative positional alignment of said bits of data within said multiple data files/streams/segments to be transmitted is defined and noted by a separate, at least one, data file/stream/segment which may or may not be transmitted simultaneously with or separately from said multiple data files/streams/segments.]

[15. The method according to claim 1 or 2, wherein said method is used to transmit data via a facsimile machine, computer, computer network, video telephone, audio, video and/or audio/video and/or data network.]

[16. The method according to claim 1–14, wherein said data to be transmitted is compressed and/or encrypted before transmission.]

[17. The method according to claim 1, wherein said compression of said data to be transmitted is achieved by segmenting said bytes of data into bits and placing each of said bits sequentially in a mapped, wrapped, stacked or patterned relationship to one another within said multiple data files/streams/segments to be transmitted simultaneously or in a timed relationship over said multi-frequency signal(s).]

[18. The method according to claim 1, wherein said compression of said data to be transmitted is achieved by segmenting said data to be transmitted into bytes and placing said bytes of said data to be transmitted in a mapped, wrapped, stacked or patterned relationship to one another within said data files/streams/segments to be transmitted simultaneously or in a timed relationship over said multi-frequency signal(s).]

[19. The method according to claim 1, wherein said compression is accomplished by placing said bits of said bytes or said bytes of data to be transmitted in a predetermined non-sequential pattern within said data files/streams/segments with said predetermined non-sequential pattern being noted in at least one separate data mapping/encryption file(s)/stream(s)/segment(s) which may be sent along with or separately from said data files/streams/segments to be transmitted.]

[20. The method according to claim 18, wherein said at least one separate data mapping/encryption file(s)/stream(s)/segment(s) corresponds to one or more key code(s) which are resident in both the sending and receiving units, said resident key code(s) being used to encrypt and decrypt said multiple data files/streams/segments.]

[21. The method according to claim 1–19, wherein said method is used to transmit data comprising an audio, video, combined audio and video and/or any like digital data signal over a communication line/medium/network.]

[22. The method according to claim 1–20, wherein said method is used as a security/encryption method.]

[23. The method according to claim 1–20, wherein said method is used as a method of data compression.]

[24. The method according to claim 1 or 2, wherein said multiple transmission frequencies comprising said multi-frequency signal containing said multiple data files/streams/segments are frequencies contained within the electromagnetic and/or optical frequency spectra.]

[25. The method according to claim 1 or 2, wherein said multiple data files/streams/segments are created from bytes of data to be transmitted, each one of said bytes being comprised of eight bits of data, each one of said bits corresponding to a particular position within each one of said bytes, and each one of said data files/streams/segments being comprised of bits from one or more of said bytes corresponding to the same particular position.]

[26. The method according to claim 24, wherein said particular position of said data within said multiple data files/streams/segments is defined and recorded within a separate clocking/encryption signal which may be sent along with or separately from said multiple data files/streams/segments.]

[27. The method according to claim 1 or 2, wherein said multiple data files/streams/segments are created from bytes of data to be transmitted, wherein each on of said multiple data files/streams/segments is comprised of at least one bit of data from said bytes.]

[28. The method according to claim 1–27, wherein said multiple data files/streams/segments are created from bytes of said data to be transmitted, wherein each of said multiple data files/streams/segments is comprised of one or more of said bytes of said data to be transmitted, wherein said bytes of data are positioned within said multiple data files/streams/segments in predetermined positions corresponding to their original positions within said data to be transmitted.]

[29. The method according to claim 1 or 2, wherein said multiple data files/streams/segments are processed looped configuration i.e. data input, cpu, memory, cpu, memory, data transmit.]

[30. The method according to claim 1 or 2, wherein said multi-frequency transmission signal containing said multiple data files/streams/segments to be transmitted is segmented and transmitted sequentially or in a defined and recorded pattern as multi-frequency data transmission segments of said data files/streams/segments to be transmitted.]

[31. The method according to claim 30 wherein said multi-frequency data transmission segments are transmitted in a predetermined pattern over time, wherein said predetermined pattern is noted and recorded within at least one separate clocking/encryption data file(s)/stream(s)/segment(s), wherein said at least one separate clocking/encryption data file(s)/stream(s)/segment(s) may be transmitted along with or separately from said multi-frequency data transmission segments, or which clocking/encryption data file(s)/stream(s)/segment(s) may transmitted as a code key which refers to a predetermined clocking/encryption-decryption file which is resident within both the sending and the receiving units and wherein said clocking/encryption-decryption file is accessed by said receiving unit by referring to said code key for the purpose of decrypting said data file(s)/stream(s)/segment(s) received from said sending unit.]

*32. A method for transmitting data, comprising:*

*splitting said data to be transmitted into two or more portions including a first data portion;*

*generating first encryption information;*

*generating a corresponding signal for each of the two or more portions of data and for the first encryption information, wherein said generated signals include a first generated signal corresponding to said first data portion and a second generated signal corresponding to the first encryption information, wherein the generated signals each have a corresponding frequency and wherein the corresponding frequencies differ from one another by at least a minimum frequency separation;*

*combining the generated signals into an output signal; and*

*transmitting the output signal over a communication channel;*

*wherein said first encryption information carried by the second generated signal is usable to decrypt data carried by at least the first generated signal.*

*33. The method of claim 32, wherein the data to be transmitted is a data file.*

*34. The method of claim 32, wherein the data to be transmitted is compressed.*

*35. The method of claim 32, wherein the data to be transmitted is organized into a plurality of bytes, and wherein said data to be transmitted is split into n streams, each stream including information from a respective bit position of each byte of the data to be transmitted.*

*36. The method of claim 32, wherein the data to be transmitted is organized into a plurality of bytes, and wherein the data to be transmitted is split into n streams such that for each n bytes of the data to be transmitted, each of said n streams corresponds to a respective one of said n bytes.*

*37. The method of claim 32, wherein said corresponding signals are generated concurrently.*

*38. The method of claim 32, wherein said corresponding signals are generated sequentially.*

*39. The method of claim 32, further comprising encrypting said data to be transmitted before said splitting.*

*40. The method of claim 32, further comprising encrypting said two or more portions of data.*

*41. The method of claim 32, wherein said first encryption information carried by the second generated signal is usable to decrypt information in the generated signals corresponding to each of the two or more data portions.*

*42. The method of claim 41, wherein said first encryption information is usable to reassemble data carried by the generated signals corresponding to each of the two or more data portions.*

*43. The method of claim 41, wherein said first encryption information is an encryption key.*

*44. The method of claim 32, wherein said communication channel includes the Internet.*

*45. The method of claim 32, wherein said communication channel includes a local-area network.*

*46. The method of claim 32, further comprising:*

*generating second encryption information; and*

*generating a third signal corresponding to said second encryption information, wherein the third generated signal has a corresponding frequency and wherein the corresponding frequency for the third generated signal and the corresponding frequency for the generated signals for the two or more data portions and the first encryption information differ from one another by at least a minimum frequency separation;*

*wherein said output signal includes said third generated signal;*

*wherein said second encryption information carried by the third generated signal is usable to decrypt information in at least one of the generated signals corresponding to the two or more portions of data.*

*47. The method of claim 32, wherein the frequency of each of the generated signals is separated from the frequencies of the other generated signals by at least 250 Hz.*

*48. The method of claim 32, wherein the first encryption information is generated based on a floating encryption algorithm.*

*49. The method of claim 32, wherein said first encryption information is an encryption key, and wherein said communication channel includes a telephone line.*

*50. A method for transmitting data, said method comprising:*

*splitting said data to be transmitted into two or more portions including a first data portion;*

*adding encryption information to at least said first data portion;*

*after said adding, generating a corresponding signal for each of the two or more portions of data, wherein said generated signals include a first generated signal corresponding to said first data portion, wherein the generated signals each have a corresponding frequency and wherein the corresponding frequencies differ from one another by at least a minimum frequency separation;*

*combining the generated signals into an output signal; and*

*transmitting the output signal over a communication channel;*

*wherein the encryption information carried by said first generated signal is usable to decrypt data carried by said first generated signal.*

*51. The method of claim 50, wherein said data to be transmitted is a data file.*

*52. The method of claim 50, wherein said data to be transmitted is compressed.*

*53. The method of claim 50, wherein the data to be transmitted is organized into a plurality of bytes, and wherein the data to be transmitted is split into n portions, each portion including data from a respective bit position of said plurality of bytes.*

*54. The method of claim 50, wherein the data to be transmitted is organized into a plurality of bytes, wherein said data to be transmitted is split into n portions, and wherein for each n bytes of data to be transmitted, each of said n portions includes a respective one of said n bytes.*

*55. The method of claim 50, further comprising encrypting said data to be transmitted before said splitting.*

*56. The method of claim 50, further comprising encrypting said two or more portions of data.*

*57. The method of claim 50, wherein the encryption information carried by the first generated signal is an encryption key.*

*58. The method of claim 50, wherein the data to be transmitted is split into n portions, and wherein each of said n portions includes encryption information.*

*59. The method of claim 50, wherein the added encryption information is generated based on a floating encryption algorithm.*

*60. The method of claim 50, wherein the added encryption information is an encryption key, and wherein said communication channel includes a telephone line.*

*61. A method for transmitting data, comprising:*

*splitting said data to be transmitted into two or more portions including a first data portion;*

*generating first control information;*

*generating a first plurality of signals, wherein each of said first plurality of signals corresponds to one of the two or more portions of data, wherein the first plurality of signals each have a corresponding frequency and wherein the corresponding frequencies differ from one another by at least a minimum frequency separation;*

*generating a control signal from the first control information;*

*combining the first plurality of signals into an output signal; and*

*transmitting the output signal over a telephone line;*

*wherein the first control information carried by the control signal is usable to decrypt information carried by the output signal.*

*62. The method of claim 61, wherein said first plurality of signals includes a first generated signal corresponding to a first data portion, and wherein said first control information is usable to decrypt information carried by at least said first generated signal.*

*63. The method of claim 61, wherein said control signal is generated concurrently with the first plurality of signals.*

*64. The method of claim 61, wherein said the output signal includes said the control signal.*

*65. The method of claim 61, further comprising transmitting the control signal, wherein said transmitting the control signal occurs at a different time than said transmitting the output signal.*

*66. The method of claim 61, wherein data in each of the two or more portions is encrypted.*

*67. A method for transmitting data, said method comprising:*

*splitting said data to be transmitted into two or more portions including a first data portion;*

*adding control information to at least said first data portion;*

*after said adding, generating a corresponding signal for each of the two or more portions of data, wherein said generated signals include a first generated signal corresponding to said first data portion, wherein the generated signals each have a corresponding frequency and wherein the corresponding frequencies differ from one another by at least a minimum frequency separation;*

*combining the generated signals into an output signal; and*

*transmitting the output signal over a telephone line;*

*wherein the control information included carried by the first generated signal is usable to decrypt information carried by the output signal.*

*68. The method of claim 67, wherein the control information carried by the first generated signal is usable to decrypt data carried by the first generated signal.*

*69. A method for receiving data, said method comprising:*

*receiving an input signal from a communication channel, wherein the input signal is a combination of at least three component signals including a control signal carrying control information and a plurality of data signals carrying data, wherein each of the at least three component signals has a corresponding frequency and wherein the corresponding frequencies differ from one another by at least a minimum frequency separation;*

*splitting said received input signal into the at least three component signals;*

*processing the plurality of data signals to recover data carried by the plurality of data signals, wherein said processing uses said control information carried by said control signal to decrypt information carried by said received input signal.*

*70. The method of claim 69, wherein said communication channel includes the Internet.*

*71. The method of claim 69, wherein said processing includes using said control information to decrypt data carried by at least a first data signal.*

*72. The method of claim 69, wherein said control information includes timing information usable to re-assemble data carried by at least a first data signal.*

*73. The method of claim 69, wherein said processing includes using said control information to perform error checking on data carried by at least a first data signal.*

*74. The method of claim 69, further comprising re-combining data recovered from each of said plurality of data signals.*

*75. The method of claim 74, wherein said communication channel includes a telephone line.*

*76. The method of claim 69, wherein said information carried by said received input signal was encrypted using a floating encryption algorithm.*

*77. A method for receiving data, said method comprising:*

*receiving an input signal from a communication channel, wherein said received input signal is a combination of two or more component signals, wherein each of the component signals carries data and wherein a first component signal further carries control information, wherein each of said component signals has a corresponding frequency and wherein the corresponding frequencies differ from one another by at least a minimum frequency separation;*

*splitting said input signal into said two or more component signals;*

*processing the two or more component signals to recover data, wherein said processing includes using said control information carried by said first component signal to decrypt information carried by said received input signal.*

*78. The method of claim 77, wherein said processing includes using said control information to decrypt data carried by said first component signal.*

*79. The method of claim 77, wherein said processing of said first component signal includes using said control information to perform error checking on data carried by said first component signal.*

*80. The method of claim 77, further comprising re-assembling data recovered from each of the two or more component signals.*

*81. The method of claim 80, wherein the communication channel includes a telephone line, and wherein the control information includes an encryption key.*

*82. An apparatus, comprising:*

*an input unit configured to receive data to be transmitted;*

*a processing unit configured to split said data to be transmitted into two or more portions including a first data portion, wherein said processing unit is further configured to generate first control information;*

*a signal generation unit configured to generate a first plurality of signals, each of which corresponds to and is generated from one of said two or more data portions, wherein said signal generation unit is further configured to generate a control signal from said first control information, wherein each of the first plurality of signals and the control signal have a corresponding frequency and wherein the corresponding frequencies differ from one another by at least a minimum frequency separation;*

*a mixing unit configured to combine the first plurality of signals and the control signal into an output signal;*

*an output unit configured to transmit the output signal over a communication channel; wherein the information carried by the control signal is usable to decrypt data information carried by the output signal.*

*83. The apparatus of claim 82, wherein the first plurality of signals includes a first generated signal generated from the first data portion, and wherein said first control information is usable to decrypt data carried by at least the first generated signal.*

*84. The apparatus of claim 82, wherein the first plurality of signals includes a first generated signal generated from the first data portion, and wherein said first control information is usable to perform error checking on data carried by at least the first generated signal.*

*85. The apparatus of claim 82, wherein said first control information is usable to re-assemble data carried by the first plurality of signals.*

*86. The apparatus of claim 82, wherein the apparatus is configured to be coupled to a telephone line.*

*87. An apparatus, comprising:*

*an input unit configured to receive data to be transmitted;*

*a processing unit configured to split said data to be transmitted into two or more portions including a first data portion, wherein said processing unit is further configured to add first control information to said first data portion;*

*a signal generation unit configured to generate a first plurality of signals, wherein each of said first plurality of signals is generated from a corresponding one of the two or more portions of data, wherein the first plurality of signals each have a corresponding frequency and wherein the corresponding frequencies differ from one another by at least a minimum frequency separation;*

*a mixing unit configured to combine the first plurality of signals into an output signal;*

*an output unit configured to transmit the output signal over a communication channel; wherein the first control information carried by the first generated signal is usable to decrypt information carried by the output signal.*

*88. The apparatus of claim 87, wherein the first plurality of signals includes a first generated signal generated from the first data portion, and wherein said first control information is usable to decrypt data carried by at the first generated signal.*

*89. The apparatus of claim 88, wherein the first plurality of signals includes a first generated signal generated from the first data portion, wherein said first control information is usable to perform error checking on data carried by the first generated signal.*

*90. The apparatus of claim 87, wherein the apparatus is configured to be coupled to a telephone line.*

*91. An apparatus, comprising:*

*an input unit configured to receive an input signal from a communication channel, wherein said received input signal is a combination of three or more component signals including a control component signal carrying control information and a plurality of data component signals carrying data, wherein each of said three or more component signals has a corresponding frequency and wherein the corresponding frequencies differ from one another by at least a minimum frequency separation;*

*a splitter unit configured to split said received input signal into said three or more component signals;*

*a processing unit configured to use said control information carried by the control component signal to recover data carried by the plurality of data component signals, wherein said processing unit is configured to use said control information to decrypt information carried by said input signal.*

*92. The apparatus of claim 91, wherein said apparatus is configured to be coupled to a telephone line.*

*93. The apparatus of claim 92, wherein said control information is usable to decrypt data carried by a first of the plurality of data component signals.*

*94. The apparatus of claim 92, wherein said control information includes timing information usable to re-assemble data carried by said plurality of data component signals.*

*95. The apparatus of claim 92, wherein said control information is usable to perform error checking on data carried by at least a first of the plurality of data component signals.*

*96. The apparatus of claim 92, wherein said processing unit is configured to re-combine data recovered from each of said plurality of data component signals.*

*97. An apparatus, comprising:*

*an input unit configured to receive an input signal from a communication channel, wherein said received input signal is a combination of two or more component signals, wherein each of said two or more component signals carries data and a first component signal also carries control information, and wherein each of said two or more component signals has a corresponding frequency and wherein the corresponding frequencies differ from one another by at least a minimum frequency separation;*

*a splitter unit configured to split said received input signal into said two or more component signals;*

*a processing unit configured to recover data from each of the two or more component signals, wherein the processing unit is further configured to use said control information to decrypt information carried by the input signal.*

*98. The apparatus of claim 97, wherein said apparatus is configured to be coupled to a telephone line.*

*99. The apparatus of claim 98, wherein said control information is usable to decrypt data carried by the first component signal.*

*100. The apparatus of claim 98, wherein said control information further includes timing information usable to recover data from the first component signal.*

*101. The apparatus of claim 98, wherein said control information is usable to perform error checking on data carried by the first component signal.*

*102. The apparatus of claim 97, wherein said processing unit is configured to re-combine data recovered from each of said two or more component signals.*

*103. The apparatus of claim 102, wherein said apparatus is configured to be coupled to a telephone line.*

* * * * *

UNITED STATES PATENT AND TRADEMARK OFFICE

CERTIFICATE OF CORRECTION

PATENT NO. : RE42,002 E
APPLICATION NO. : 11/482204
DATED : December 14, 2010
INVENTOR(S) : Riceman et al.

It is certified that error appears in the above-identified patent and that said Letters Patent is hereby corrected as shown below:

On the Title Page, item [56]:

Page 2, item (56), under "Other Publications", in Column 1, Line 5, after "Calculations" delete "fo" and insert -- for --.

Page 2, item (56), under "Other Publications", in Column 1, Line 17, after "System" insert -- for --.

Page 2, item (56), under "Other Publications", in Column 1, Line 33, delete "ARQ/Fec" and insert -- ARQ/FEC --.

Page 2, item (56), under "Other Publications", in Column 2, Line 26, delete "Comunications," and insert -- Communications, --.

Page 2, item (56), under "Other Publications", in Column 2, Line 40, delete "Adsl:" and insert -- ADSL: --.

Column 1, line 12, delete "benifit" and insert -- benefit --.

Column 6, line 23, delete "I claim:" and insert -- We claim: --.

Signed and Sealed this
Seventeenth Day of May, 2011

David J. Kappos

David J. Kappos
*Director of the United States Patent and Trademark Office*